United States Patent Office 2,774,697
Patented Dec. 18, 1956

2,774,697

ADHESIVE COMPRISING ALKENYL DIGLYCOL CARBONATE AND ARTICLES BONDED THEREWITH

Francis F. Koblitz, Fitchburg, Wis., assignor to Bjorksten Research Laboratories, Inc., Madison, Wis., a corporation of Illinois No Drawing. Application June 17, 1953, Serial No. 362,411

14 Claims. (Cl. 154—43)

This invention relates to improved adhesives comprising a mixture of vinyl polysiloxane together with a co-polymer of allyl diglycol carbonate which are especially suitable for adhering glass, metals, and acrylic resins to one another.

Improved adhesives having superior properties for bonding various materials to one another have been one of the prime objects of technology for some time and improved adhesives for bonding such materials as glass, metals, and acrylic resins to one another are especially desired. I have discovered an improved adhesive of this sort which comprises primarily the co-polymer of an alkenyl diglycol carbonate with another synthetic resin monomer.

It is therefore an object of this invention to provide improved adhesives and especially adhesives which are particularly suitable for bonding such materials as glass, metals, and acrylic resins to one another.

Another object is to provide such adhesives comprising an alkenyl diglycol carbonate.

Further objects will become apparent as the following detailed description proceeds in which it is my intention to illustrate the applicability of the invention without limiting it to less than its full scope including all equivalents.

The following examples are presented to illustrate the invention.

Example 1

| | Parts |
|---|---|
| Allyl diglycol carbonate (monomeric) | 25 |
| Benzoyl peroxide | 1 |
| Methylmethacrylate (monomeric) | 25 |

The first two ingredients were mixed and heated 30 minutes at 80° C. The third ingredient was then added and the mixture was thoroughly agitated and then heated for an additional 30 minutes at 80° C. An additional 25 parts of methylmethacrylate monomer were than added with agitation and the solution was then cooled quickly to room temperature. A layer of the resulting material was used as an adhesive between pairs of blocks of the following materials, respectively

| Sample | 1st Block | 2nd Block |
|---|---|---|
| 1 | polymethylmethacrylate | polymethylmethacrylate. |
| 2 | glass | glass. |
| 3 | aluminum | aluminum. |
| 4 | glass | Do. |
| 5 | polymethylmethacrylate | Do. |
| 6 | do | glass. |

Each of these samples thus prepared was heated two days at 80° C. to cure the adhesive by completion of the co-polymerization. The adhesion in each case was strong or extreme.

Example 2

A room temperature curing adhesive was prepared by adding 1% of cobalt naphthenate to the material prepared according to Example 1. Samples corresponding to Samples 1 to 6 were prepared utilizing this solution as an adhesive and each of the samples was cured 18 hours at room temperature and 1 hour at 80° C. Suitable adhesion was observed in each case. Each sample withstood immersion in boiling water for more than 2 hours.

Example 3

Samples corresponding to samples 1, 2, 4, 5 and 6 were prepared from the material used in Example 1. They were cured by exposure to ultra-violet light for 24 hours.

Example 4

25 parts by weight of allyl diglycol carbonate were mixed with 25 parts of ethylmethacrylate and 1 part of benzoyl peroxide. This mixture was heated 30 minutes at 80° C. under a carbon dioxide atmosphere. Samples corresponding to samples 1 to 6 in Example 1 were prepared and polymerized by heating 2 days at 80° C. Duplicate samples were polymerized by ultra-violet light.

Example 5

25 parts by weight of butyl methacrylate were mixed and reacted with 25 parts by weight of allyl diglycol carbonate and 1 part of benzoyl peroxide. The mixture was treated and tested as in Example 4.

Example 6

10 parts of allyl methacrylate, 15 parts of methyl methacrylate and 25 parts of allyl diglycol carbonate were mixed. 1 part of benzoyl peroxide was added and the mixture was treated and tested as in Example 4.

Example 7

25 parts of allyl di-propylene glycol carbonate was co-polymerized with methyl methacrylate as in Example 1. The samples were prepared and cured as in Example 4.

Example 8

10 parts of glycol di-methacrylate, 15 parts of ethyl methacrylate, 25 parts of allyl diglycol carbonate, and 1 part of benzoyl peroxide were mixed. The mixture was treated and tested as in Example 4.

Other metals which may be used include iron, steel, nickel and possibly tin and zinc. Copper and lead inhibit polymerization somewhat.

Other resins which may be incorporated in the composition include allyl di-propylene glycol carbonate, allyl di-butylene glycol carbonate, allyl di-pentylene glycol carbonate, allyl di-glycol carbonate, vinyl diglycol carbonate, that is, alkenyl di-polymethylene glycol carbonates.

Other resins for co-polymerizing with said carbonate resins include ethyl methacrylate, butyl methacrylate, cyclohexyl methacrylate, other alkyl methacrylates, vinyl methacrylate, glycol di-methacrylate, allyl methacrylate, methyl α-chloroacrylate, other alkyl α-chloroacrylates, alkyl acrylates, di-methacrylate esters of polyethylene glycols and allyl ethers of polyethylene glycols.

The invention relates preferably to preparing a co-polymer from a monomer having the formula:

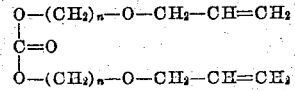

where $n$ may be from 2 to 7, and a monomer having the formula:

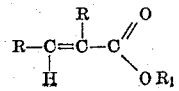

wherein R is —H, —Cl, —Br or —CH$_3$ and R$_1$ is an aliphatic radical containing from one to seven carbon atoms.

The addition of 0.5% of vinyl polysiloxane as a reactant in preparing the compositions of Examples 1, 2 and 4 provides adhesives which satisfactorily retain adhesive properties at 400° F.

Butoxy methyl methacrylate or butyl maleate have been found to act satisfactorily as internal plasticizers when added to the compositions of the invention in suitable amounts.

Thus it may be seen that the invention is broad in scope and is not to be limited except by the claims.

Having thus disclosed my invention, I claim:

1. As a composition of matter, a mixture of copolymer formed from a monomer having the formula:

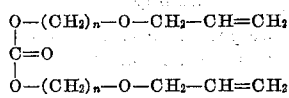

wherein $n$ may be from 2 to 7, and a monomer having the formula:

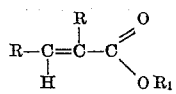

wherein R is selected from —H, —Cl, —Br, and —CH$_3$ and R$_1$ is an aliphatic hydrocarbon radical containing from one to seven carbon atoms and vinyl polysiloxane in the amount of about .5% of the amount of said copolymer.

2. The composition of claim 1 wherein said aliphatic radical is saturated.

3. The composition of claim 1 wherein said aliphatic radical is unsaturated.

4. The composition of claim 2 wherein said aliphatic radical is methyl.

5. The composition of claim 2 wherein said aliphatic radical is ethyl.

6. The composition of claim 2 wherein said aliphatic radical is cyclohexyl.

7. The composition of claim 3 wherein said aliphatic radical is allyl.

8. Two articles adhesively bonded together with the composition of claim 1.

9. Two articles adhesively bonded together with the composition of claim 2.

10. Two articles adhesively bonded together with the composition of claim 3.

11. Two articles adhesively bonded together with the composition of claim 4.

12. Two articles adhesively bonded together with the composition of claim 5.

13. Two articles adhesively bonded together with the composition of claim 6.

14. Two articles adhesively bonded together with the composition of claim 7.

References Cited in the file of this patent

UNITED STATES PATENTS

| | | |
|---|---|---|
| 2,445,535 | Parsons et al. | July 20, 1945 |
| 2,445,536 | Parsons et al. | July 20, 1945 |
| 2,420,911 | Roedel | May 20, 1947 |
| 2,715,135 | Brooks et al. | Aug. 9, 1955 |
| 2,716,638 | Cohen et al. | Aug. 30, 1955 |

FOREIGN PATENTS

| | | |
|---|---|---|
| 620,693 | Great Britain | Mar. 29, 1949 |